United States Patent [19]

Tran et al.

[11] Patent Number: 5,578,342

[45] Date of Patent: Nov. 26, 1996

[54] ALIGNMENT OF MAGNETIC POLES OF THIN FILM TRANSDUCER

[75] Inventors: Ut Tran, San Jose; Tai Lee, Saratoga; Tran Son, Milpitas, all of Calif.

[73] Assignee: Read-Rite Corporation, Milpitas, Calif.

[21] Appl. No.: 498,169

[22] Filed: Jul. 5, 1995

[51] Int. Cl.⁶ .............................. B05D 5/12; B05D 1/18; C25D 5/02; C23C 14/32

[52] U.S. Cl. .................. 427/131; 427/443.2; 216/22; 216/41; 216/66; 205/119; 205/122; 204/192.34

[58] Field of Search ............. 204/192.34; 205/119, 205/122; 427/131, 443.2; 216/22, 41, 66

[56] References Cited

U.S. PATENT DOCUMENTS 4,436,593  3/1984  Osborne et al. .................. 427/131
5,314,596  5/1994  Shukovsky et al. .................. 427/131
5,438,747  8/1995  Krounbi et al. .................. 204/192.34

*Primary Examiner*—Kathryn Gorgus
*Assistant Examiner*—Edna Wong
*Attorney, Agent, or Firm*—Nathan N. Kallman

[57] ABSTRACT

A process for producing a thin film magnetic head uses the upper magnetic pole as a self-aligning mask for partially trimming the lower magnetic pole, wherein the yoke and pole tip regions to be trimmed are processed by separate and distinct photolithographic steps, thereby achieving noncritical alignment in the yoke area, while maintaining critical alignment in the pole tip region which includes the transducing gap.

4 Claims, 5 Drawing Sheets

ALIGNMENT OF MAGNETIC POLES OF THIN FILM TRANSDUCER

FIELD OF THE INVENTION

This invention relates to thin film magnetic transducers and in particular to a method of aligning the upper and lower layers that form the poles of the magnetic yoke including the pole tips in the transducing gap area.

DESCRIPTION OF THE PRIOR ART

Thin film magnetic transducers are formed with a lower pole layer P1 and an upper pole layer P2, typically made of Permalloy, a NiFe alloy, that are connected at a back closure to form a magnetic circuit with a nonmagnetic gap at the pole tips for transducing data. An electrical coil assembly, of one or more layers, encompassed by insulation is provided between the two pole layers. In conventional thin film heads, the leading P1 pole is typically wider than the trailing P2 pole due to tolerances in photolithographic alignment. This results in possible variations of the width of the data track that is recorded. Thin film heads use relatively wide leading pole write data transitions that are wider than the trailing pole and thus are poorly defined at the track edges. Such undesirable write characteristics are the result of nonuniform side fringing of the write fields. It is known that the extent of such side fringing is critically dependent on the width of the write gap and the extent of the pole overlap. By trimming the poles, wherein the width of the P1 and P2 poles are substantially equal with well-defined aligned edges, side fringing can be significantly reduced. Thus, an objective in the manufacture of thin film magnetic transducers is to make the P1 and P2 pole tips of substantially the same width and in precise vertical alignment relative to each other.

When thin film heads are used with disk drives that process data on storage tracks of a magnetic disk, the data tracks are spaced as closely as possible, such as 2400 tracks per inch, in order to attain high data storage density. With closely spaced tracks, it is also necessary to provide very precise alignment of the P1 and P2 pole tips to enable proper operation.

As described heretofore, thin film magnetic transducers include an electrical coil assembly located between the P1 and P2 pole layers. In prior art thin film transducers, the coil assembly typically is formed with one or two layers or levels of coil turns. If a plurality of coil layers are used, then layers of photoresist insulation need to be provided between the coil layers as well as between the coil assembly and the P1 and P2 pole layers. In some presently made transducers, three or four coil layers are provided to establish a longer electrical path with reduced electrical resistance and better heat dissipation. It is apparent that as the number of layers of coil turns and adjacent insulation layers are increased, the spacing between the P1 and P2 layers is increased accordingly. Thus precise alignment of the P1 and P2 poles and the pole tips at which the transducing gap is located, which affects the side fringing of the recorded signal, becomes more critical.

One prior art approach for solving this problem, such as described in U.S. Pat. No. 4,992,901 (Keel et al.) and 5,200,056 (Cohen et al.), is to use sacrificial mask layers for aligning the P1 and P2 pole tips in conjunction with ion milling to trim the lower P1 layer completely so that the P1 pole tip is substantially of the same width and shape as the P2 pole tip. The use of sacrificial masks with a full trim of the P1 layer, as practiced in the prior art, involves framing the P2 pole tip area with a photoresist mask and using a relatively long milling time. Only part of the P2 frame is exposed so that the P1 pole tip region remains protected while the upper P2 frame is uncovered to allow deposition of sacrificial material. The extra steps of masking with sacrificial layers and removal of the resist from the frame area increases the complexity of making the thin film head and the time needed for masking and milling. Also, the extra masking step used to remove resist from the frame area in order to deposit the sacrificial mask material changes the shape of the head yoke area. A sacrificial material has to be used that can be removed differentially by a chemical etch process to remove the remaining sacrificial material on top of the P2 layer. Since a different material must be used, there is a possibility that an undesirable metallic compound may be formed during milling which could contaminate the Permalloy material of the P1 and P2 magnetic layers.

The need for the full trim of the P1 pole tip and the need for sacrificial layers of different material than the NiFe magnetic pole material require that the P2 resist masking frame that defines the P2 pole tip should be thick, about 7–10 micrometers thicker resist than generally used. The P2 pole thickness is typically about 3.8 microns when first plated and then after ion milling of the P2 seed layer, the final thickness of the P2 pole is about 3.5 microns, which is specified as a standard thickness.

Another approach to making thin film transducers wherein side fringing effects are reduced and data track density is increased is described in Batra et al. U.S. Pat. No. 5,267,112. In this case, the P1 pole layer is beveled to the zero throat height and the plated Permalloy P2 pole is used as a mask for the P1 pole during ion milling. An additional thickness of Permalloy is plated on the P2 layer, after which the photoresist frame is completely stripped. With this process, the insulation and the ends of the coil are exposed and thus are subject to being etched so that the thin film transducer would not be operable. Consequently production yield is low. Also, as in the approach described, supra, data track width is difficult if not impossible to control.

SUMMARY OF THE INVENTION

An object of this invention is to provide a method for aligning the P1 and P2 pole tips at the gap region of a thin film magnetic transducer using a simplified and time-saving method.

Another object of this invention is to provide a method that employs a partial pole trim for aligning the P1 and P2 poles of a thin film magnetic transducer.

Another object is to provide a method of fabricating a thin film magnetic transducer which enables self-alignment of the P1 and P2 magnetic poles without using sacrificial layers.

A further object is to provide an improved method of making a thin film magnetic transducer that realizes a decrease in side fringing of the recorded data signal.

Another object is to provide a method for making a thin film magnetic transducer whereby the recorded data track width is effectively controlled.

In accordance with this invention, the magnetic poles of a thin film magnetic transducer are aligned by using the upper P2 pole as a self-aligning mask for partially trimming the lower P1 pole, No sacrificial layers are needed and no chemical etching is used for removing such sacrificial layers. Only a single metal, such as NiFe or Permalloy (a nickel-iron alloy), is used to form the P2 pole layer, which is employed as a mask for the partial trim of the P1 pole layer in the gap region. A partial trim is effectuated by use of a P2 photoresist frame in the back yoke region while opening the pole tip region to allow trimming of the pole tip region only. By virtue of the method disclosed herein, the geometry of the P2 pole layer is established and pole tips adjacent to the transducing gap are precisely aligned. By the partial trimming using a "split yoke" masking process, the P1 and P2 pole tips have substantially identical dimensions at the transducing gap. As a result, fringing write fields are effectively reduced, and higher track per inch (tpi) density is realized. A wider P2 pole can be used to increase the signal-to-noise ratio and improve head performance, in contrast to a nontrimmed thin film transducer.

BRIEF DESCRIPTION OF THE DRAWINGS

The invention will be described in greater detail with reference to the drawings in which.

DETAILED DESCRIPTION OF THE INVENTION

Figure 1:
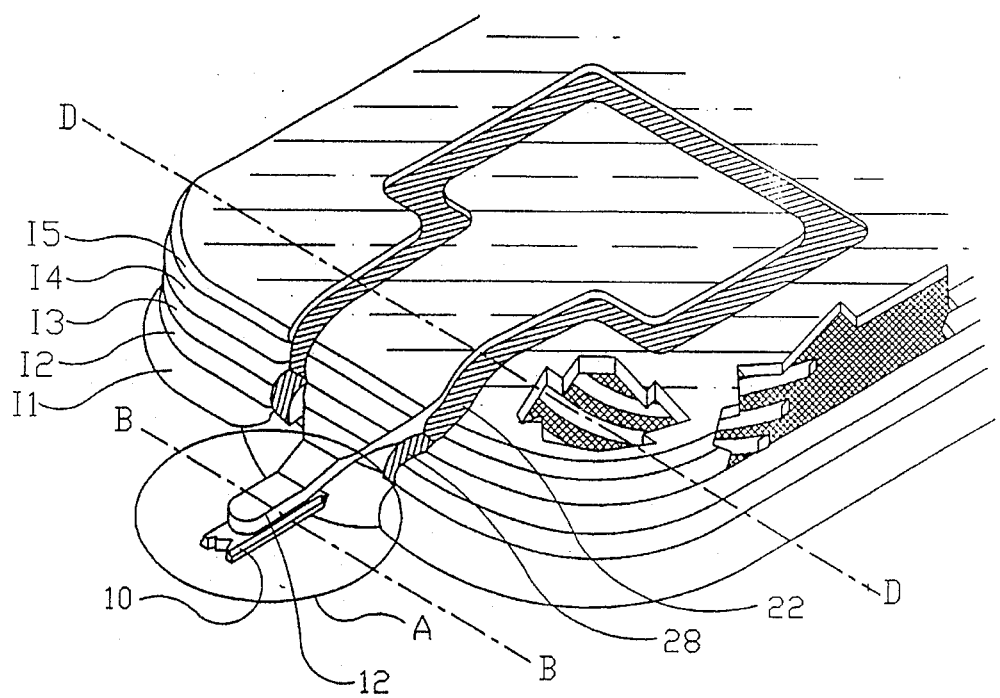
FIG. 1 is an isometric top view, partly broken away, showing a thin film magnetic transducer made in accordance with the method of this invention.
Figure 2:
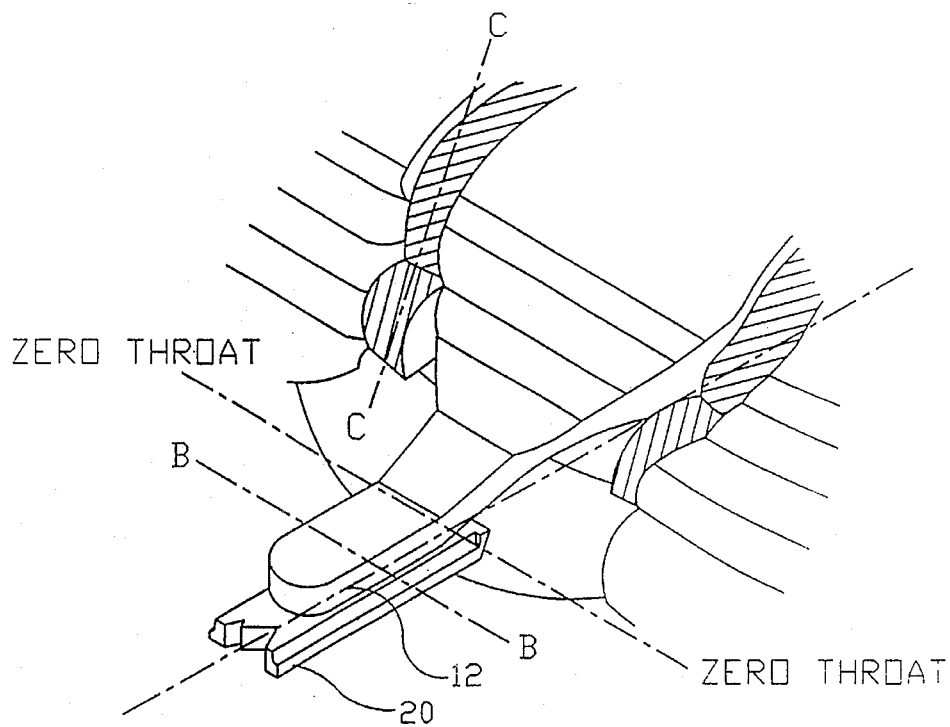
FIG. 2 is an enlarged isometric view of encircled portion A of the magnetic transducer.
Figure 3:
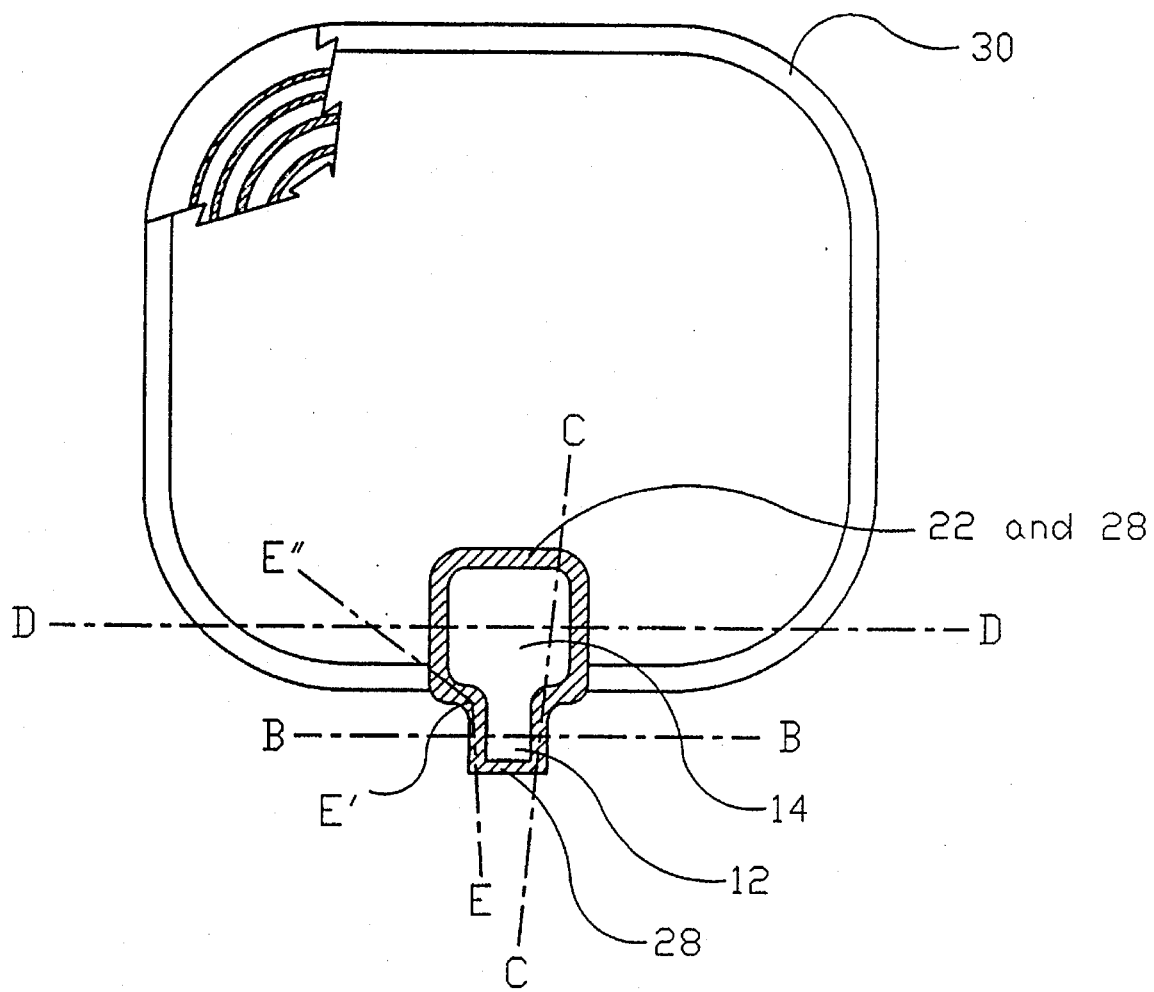
FIG. 3 is a top plan view of the thin film magnetic transducer of FIG. 1, partly broken open to show the electrical coil.

With reference to FIG. 1 and the exploded partial view of FIG. 2, a thin film magnetic transducer is partially shown having a pole tip region including a P1 pole tip 10 and P2 pole tip 12 made of an iron/nickel alloy, such as Permalloy. The P2 pole tip 12 and the back region of the P2 pole layer 14 are depicted in FIG. 3. As shown in FIGS. 4–10, a nonmagnetic ceramic substrate or wafer 40, made from aluminum oxide/titanium carbide, by way of example, provides a support for a thin insulating alumina layer (not shown). A nickel/iron seed layer is formed over the alumina layer on which the first magnetic pole layer, designated as P1, is plated. As practised in the prior art, the P1 pole layer is formed by spinning photoresist and by mask and photolithography to form a frame for plating the P1 pole layer. After forming the P1 pole layer, an alumina layer is deposited to provide a transducing gap between the P1 pole and subsequently formed P2 pole layer. As depicted in FIG. 11, a first insulation layer I1 of hard-baked photoresist is deposited over the P1 pole layer and a first layer 16 of an electrical coil assembly is deposited on the I1 insulation. A second insulation layer I2 of hard-baked photoresist is deposited over the coil layer 16 and a second layer 18 of the coil assembly is deposited on the I2 insulation. A third hard-baked photoresist insulating layer I3 is deposited over the coil layer 18 and a third coil layer 20 is formed over the I3 insulation layer. Fourth and fifth hard-baked photoresist insulating layers I4 and I5 are then deposited over the coil layer 20 so that all of the coils are encompassed by insulation. The coil layers 16, 18 and 20 are interconnected through vias to provide a continuous circuit path which is connected by leads to external head circuitry, as is well known in the art.

It should be understood that additional coil layers may be added to the three-coil assembly described herein. Each additional coil adds to the complexity of the transducer structure and the required precise alignment of the pole tips becomes more difficult if using the conventional prior art approaches.

After deposition of the I5 insulation layer, the second pole layer P2 is then plated over the insulating layer I5 by depositing a nickel/iron seed layer and spin coating a thick photoresist over the seed layer. The prior art conventionally uses a mask for a full frame of the P2 pole layer to plate the NiFe P2 layer. After stripping the photoresist used for the P2 frame, the transducer structure is ion milled to trim the P2 and P1 pole tips. After ion milling, a copper stud is formed for connection of the coil assembly to an external circuit. The transducer structure is covered with an insulating overcoat to protect the transducer from the deleterious effects of humidity and mechanical shock.

Figure 9:
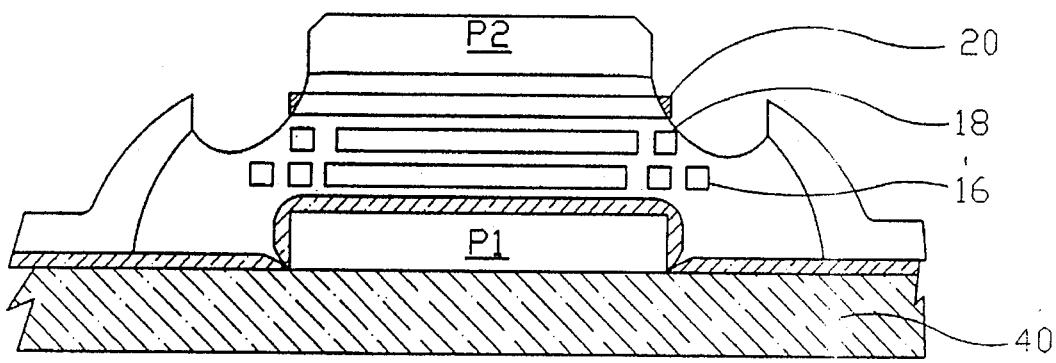
FIG. 9 is a cross-sectional view illustrating a partial thin film magnetic transducer made by the prior art approach and the results after ion milling.

As shown in FIG. 9, which depicts the results of ion milling a thin film transducer with three coil layers by prior art techniques, the ion milling which trims the P2 pole tip also will remove the insulation surrounding the coil layers 16, 18, 20 and will also mill the uppermost coil layer 20. This would render the transducer inoperable and would decrease production yield significantly.

In keeping with this invention, after providing the I5 insulation layer, a thin Permalloy seed layer is deposited over the I4 insulation layer. Prior to plating the P2 pole layer, a thick layer of photoresist, about 6–7 microns thick, is first deposited by spin coating, and by masking and photolithography is used to define a partial P2 frame 22, shown in FIG. 1. This partial frame 22 is formed by a layer of hard-baked photoresist that is spun over the P2 seed layer and baked at about 120° Centrigade.

Figure 4:
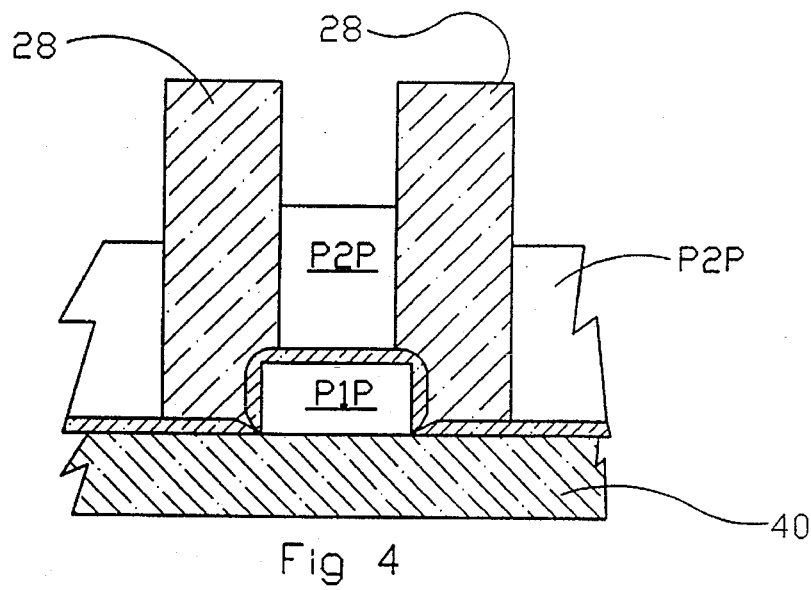
FIGS. 4–6 are cross-sectional views taken along line B—B of FIG. 1 showing sequential steps of the method of this invention.
Figure 5:
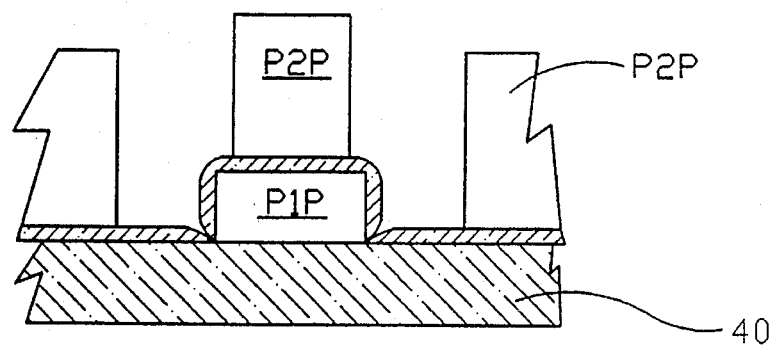

After forming the partial frame 22, which leaves the pole tip region exposed while framing the back region of the P2 pole layer as shown in FIG. 1, a thin layer of low viscosity photoresist is spun on to form a photoresist frame 28 for the P2 pole layer. By masking and developing the frame 28, the pole tip region is opened and exposed. A Permalloy layer, designated as P2P, is then deposited to a total thickness of about 6 microns, as depicted in FIG. 4.

In the prior art, masking and framing for subsequent ion milling and trimming of the pole tips are carried out after plating the P2P layer. In accordance with this invention, a partial mask is used to expose the pole tip area prior to plating the P2P layer. After plating of the P2P layer, the thin, low viscosity photoresist 28 is developed so that the P2 pole tip frame is open, as in FIG. 5. The seed layer and the P1 and P2 pole tips are then trimmed by ion milling, as shown in FIG. 6, without affecting the back yoke region wherein the coil layer assembly and the insulation surrounding the coils are located.

To complete the assembly, as implemented in the prior art, copper studs are formed for connection to the coil assembly with external circuitry. A protective alumina overcoat is provided over the transducer structure. In the structure disclosed herein, the P2 pole of the transducer structure slopes at the edge or perimeter 30 of the thin film head structure, as shown in FIG. 3.

The photoresist frame 22 is used for protecting the insulation which encapsulates the coil assembly so that with appropriate ion milling, there is no intrusion into the sensitive region of the coil layers and their insulation. The thickness of the photoresist frame 22 is typically in the range of about 4 to 10 microns, depending on the amount of the P2 pole tip to be milled and the actual thickness of the P2 pole. FIGS. 1 and 2 depict the pole tip region, which is masked with photoresist of lesser thickness than that of the frame photoresist, to maintain tight tolerances on the width of the P2 pole layer prior to plating the P2 pole layer through the photolithographic frame.

Figure 6:
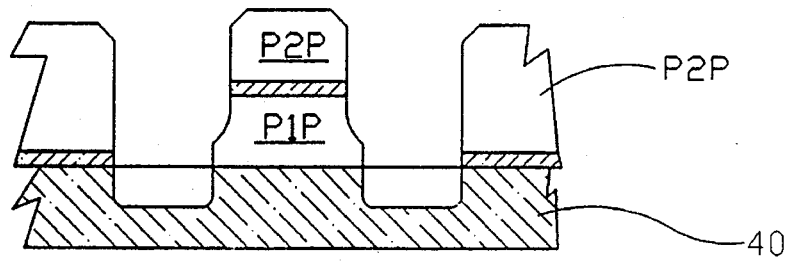

FIG. 6 illustrates the head structure and the defined P2 pole tip after photoresist 22 has been stripped from the pole tip region. The stripping of the photoresist 22 is accomplished by exposing only the pole tip region prior to plating the P2 pole and then developing the exposed region after plating. After plating and after removal of the photoresist 28, the P2 pole tip and the underlying transducing gap insulation and the P1 pole tip are formed by ion milling. In the present implementation, the ion milling progresses for about 50 minutes and leaves a portion of the P1 pole tip that extends beyond the width of the P2 pole tip, as illustrated in FIG. 6. The time for milling approximately 2.5 microns of the P2 layer for achieving a partial trim of the P1 pole layer is about 60 minutes, which is considerably shorter than the conventional 3 hours approximately required with prior art methods. The P2 pole effectively serves as a mask, in accordance with this invention, thereby precluding the need for sacrificial masks as practiced in some prior art approaches. As a result, a P2 pole tip that is precisely aligned with the P1 pole tip is formed without any additional photoresist masks. Milling time is significantly reduced because only a partial trimming of the P1 pole tip is needed to provide the desired alignment of the P1 and P2 pole tips adjacent to the transducing gap.

The photoresist mask 22 is made preferably from a positive resist from the AZ 4000 series and protects the coil assembly disposed within the cross-linked insoluble photoresist layer insulation layers I1–I5. The photoresist mask resist 22 is hard baked to prevent the dissolution of the resist 22 during a subsequent spin step. The mask 28 effectively defines the width of the P2 pole tip so that it will be in precise alignment with the P1 pole tip in the transducing area.

In the embodiment of the process of this invention, prior to plating, the P2 frame layer is partially exposed in the pole tip region only, at several microns to the rear of the zero throat line. Zero throat may be defined as the point at which the P2 layer diverges from the pole tip region to the transducer back yoke region. The partial exposure ensures that the photoresist on both sides or edges of the P1 pole layer is also completely removed by standard photolithographic development processes. This procedure precludes the need for separately masking the rear yoke region, thus rendering the process insensitive to alignment variables in the back yoke region, and avoids extra photolithographic masking and machining installation.

With the process as disclosed, unbaked resist layer 28 sits on top and extends beyond baked resist layer 22 by 4–10 micrometers toward zero throat. Unbaked photoresist 28 is provided so that redeposited ions which appear during ion milling are captured by the unbaked photoresist. The redeposited material is removed subsequently by ion milling of the unbaked photoresist during pole trimming, which in effect is a self-cleaning process.

Figure 7:
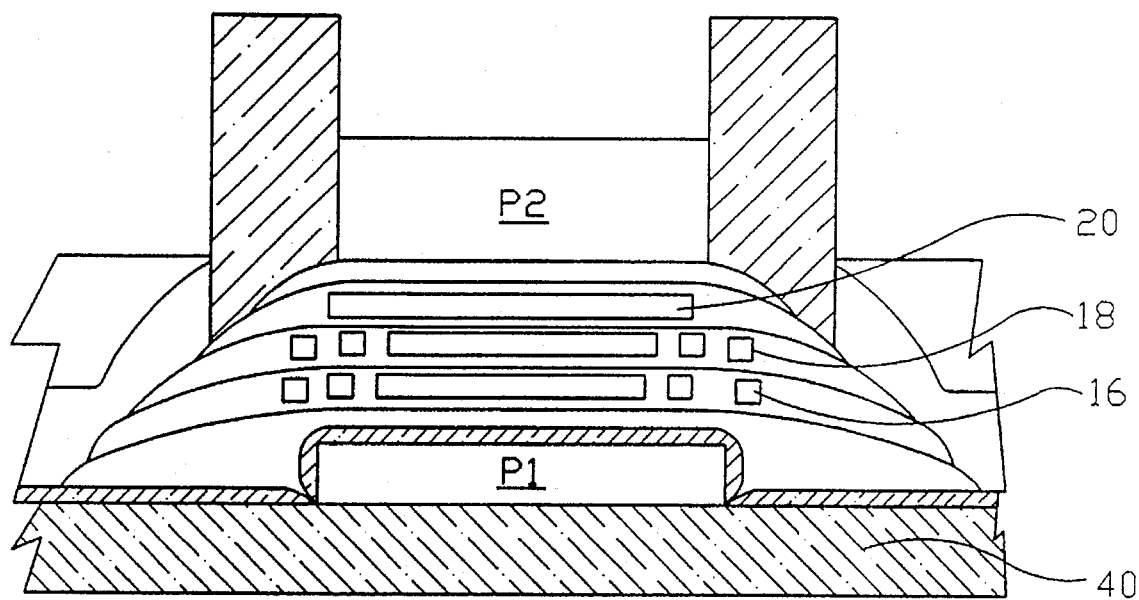
FIG. 7 is a cross-sectional view, partly broken away, taken along line D—D of FIG. 1, and corresponds to FIGS. 4 and 5.
Figure 8:
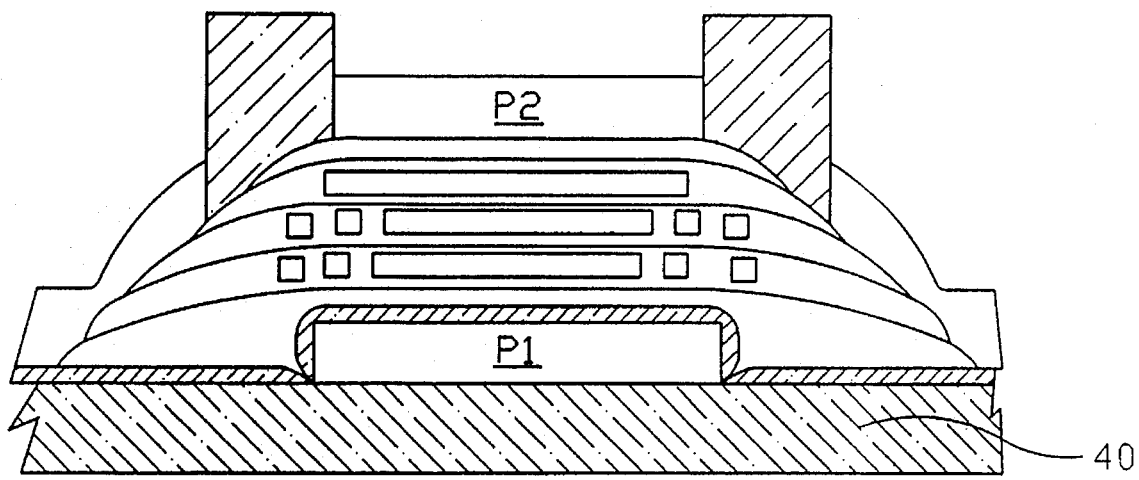
FIG. 8 is a cross-sectional view, partly broken away, taken along line D—D of FIG. 1, and corresponds to FIG. 6.
Figure 10:
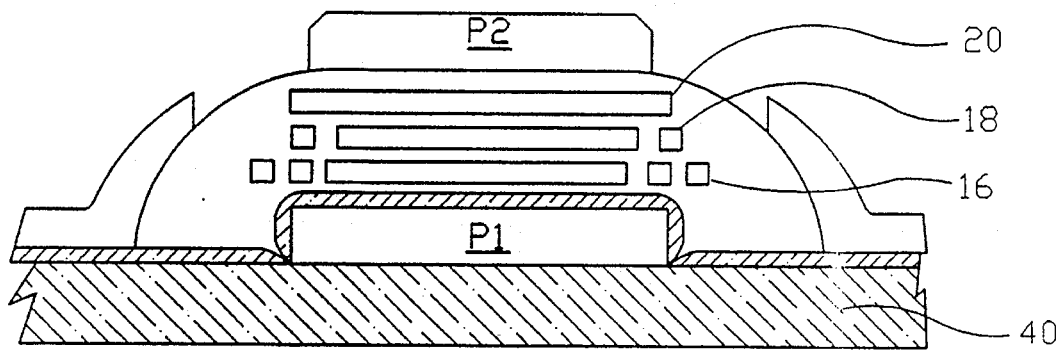
FIG. 10 is a cross-sectional view in part of the thin film magnetic transducer made in accordance with this invention, and delineating the difference from the prior art approach of FIG. 9.
Figure 11:
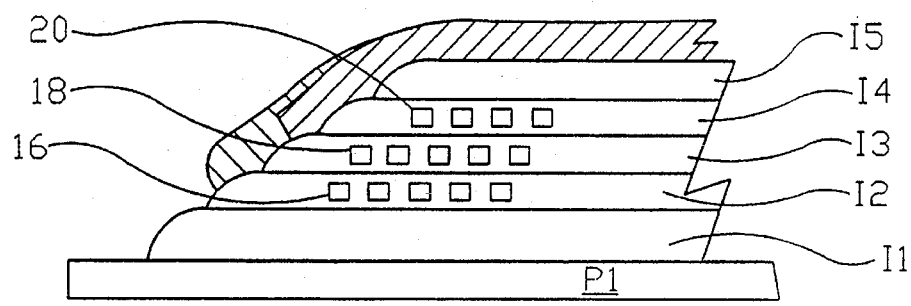
FIG. 11 is a cross-sectional view, partly broken away, taken along line C—C of FIG. 2, showing the lower portion of the resist frame adjacent to the transducing gap.

With reference FIGS. 7–8 and 10, a multilevel coil assembly is shown embedded within insulation I1–I5 which prevents electrical shorting of the conductive P1 and P2 NiFe pole layers. After removal of the resist from the pole tip region, as described, the photoresist within the frame 22 in the back region of the magnetic yoke is retained to protect the insulation during ion milling of the pole tips during the trimming process. After the milling step, the photoresist and the NiFe seed layer are removed from the area of the frame 22. The Permalloy material including the NiFe seed layer in the P2 field area is removed by chemical etching. The final thickness of the P2 pole in the pole tip region is about 2 to 4 microns.

By virtue of this invention, a "split yoke" process is provided for shaping the P2P layers with good critical dimensional control for the pole tip, while providing sufficient resist thickness in the back yoke frame for protection of the insulation and coil structure. A simplified method using the width of the P2 pole to define the width of the P1 pole is provided, without the use of sacrificial masks and without additional resist coating and resist stripping steps for protecting the rear yoke. Also, with this invention, the time for ion milling is reduced and higher yield is realized, as there is no damage due to penetration of the coil and the coil insulation. Furthermore, self-cleaning of the redeposition material that occurs with milling is effectuated. In addition, the process of this invention prevents damage that can result in dielectric breakdown and shorting of the coil to the pole material, thereby providing a simple, high yield process for pole trimming of thin film magnetic heads.

What is claimed is:

1. A split yoke process of making a thin film magnetic head comprising the steps of:

providing a nonmagnetic substrate;

depositing an insulating alumina undercoat layer on said substrate;

forming a first magnetic pole layer including a pole tip region and a back yoke region by (a) forming a seed layer of magnetic nickel/iron material over said insulating alumina undercoat layer, (b) spin coating photoresist and masking to form a frame for defining said first magnetic pole layer, and (c) plating a layer of nickel/iron material to produce said first magnetic pole layer;

depositing an insulating layer over said first magnetic pole layer for providing a transducing gap;

depositing at least one layer of electrically conductive coil material and encompassing said coil material with insulating hard baked photoresist;

forming a second magnetic pole layer including a pole tip region and a back yoke region by (a) forming a seed layer of magnetic nickel/iron material over said insulating hard baked photoresist; (b) providing a partial mask for framing only a part of the second magnetic pole layer which forms a partial frame which leaves the pole tip region exposed while framing the back region of the second magnetic pole layer; (c) spin coating a thin layer of low viscosity photoresist and (d) using masking and photolithography, plating a layer of magnetic nickel/iron material to produce the second magnetic pole layer;

stripping said low viscosity photoresist in said pole tip region;

trimming said pole tip regions by ion milling and using said second magnetic pole layer as a mask;

so that the widths of the pole tips of said second pole and said first pole adjacent to said transducing gap are equal and said pole tips are in precise alignment.

2. A process as in claim 1, wherein said step of plating is used to plate said second pole layer to a thickness of about 6 microns.

3. A process as in claim 1, wherein the step of ion milling of said second pole layer and partial trimming of said first pole layer is achieved in about 60 minutes.

4. A process as in claim 1, wherein the step of forming said photoresist frame comprises baking said photoresist at 120 degrees Centigrade.

* * * * *